Aug. 6, 1935.  H. BOSCH, JR  2,010,006

RETRIEVING MECHANISM

Filed Dec. 18, 1933

INVENTOR.
Henry Bosch, Jr.
BY Townsend & Loftus
ATTORNEYS.

Patented Aug. 6, 1935

2,010,006

UNITED STATES PATENT OFFICE 2,010,006

RETRIEVING MECHANISM

Henry Bosch, Jr., San Francisco, Calif.

Application December 18, 1933, Serial No. 702,947

9 Claims. (Cl. 242—101)

This invention relates to a combination storage and retracting or retrieving apparatus for extension cords and the like.

A great variety of electric appliances are in general use, such as electric irons, bread toasters, waffle irons, heating pads, washing machines, etc. Each of these devices is only in intermittent use and, when used, are connected with an electric service outlet commonly known as a base or wall outlet, through means of a plug and an extension cord. Whenever an appliance is to be used, it is necessary to find an extension cord and then to connect one end with the service outlet and the other end with the appliance, and when the user is through with the appliance it is necessary to disconnect both ends of the extension cord and to place it on a shelf, in a drawer, or in a cupboard where it is not readily found when required.

In disconnecting the extension cord it is common practice to yank or pull on the cord to free or remove the plug from the service outlet. This causes wear and tear and tends to pull the wire ends away from the terminal connections of the plug with the danger of short circuiting, etc., and besides that, it is a bother and a general nuisance as time is lost in finding the extension cord when it is needed and time is also lost in connecting and disconnecting the same.

The object of the present invention is to overcome the objections above referred to; to provide a device in which the extension cord is housed and stored and from which it may be readily extended when ready for use; to provide an extension cord which is permanently connected with a source of electric current supply and which requires only one connection, to wit, that of plugging the free end of the cord into the appliance to be used; to provide means for securing the extension cord against retraction when extended and in use; and, further, to provide means for automatically retracting the extension cord when it is to be returned to the storage base for rendering the retracting mechanism inoperative during retraction of the cord if the cord is released.

The invention is shown by way of illustration in the accompanying drawing, in which—

Figure 1:
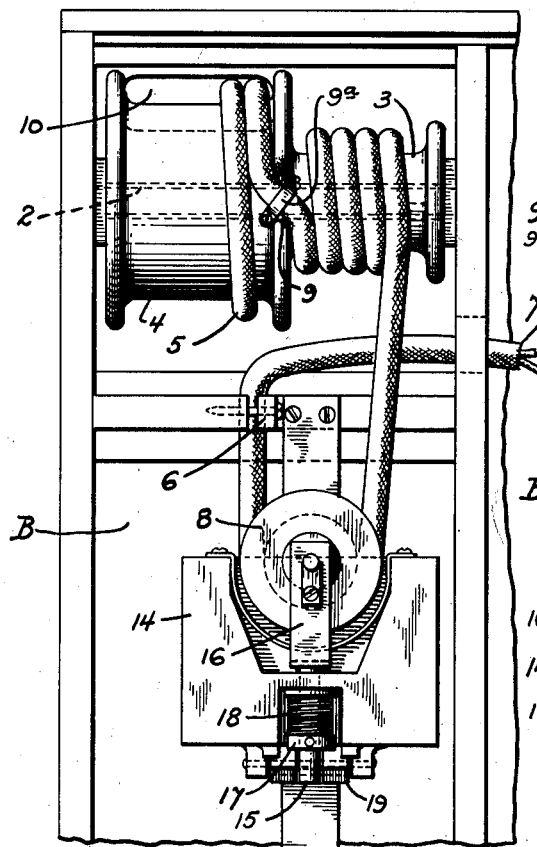
Fig. 1 is a front elevation of the storage compartment, together with the mechanism for receiving the extension cord and for retracting the same.

Referring to the drawing in detail, A indicates a housing of any suitable character, in which is formed a compartment generally indicated at B. In the upper portion of the compartment is secured a shaft 2 and freely rotatable thereon is a reel which is divided into a small and a large section, indicated at 3 and 4, respectively. Wound about the two sections of the reel is an extension cord, which is generally indicated at 5. One end of this cord is permanently and rigidly secured within a housing at the point indicated at 6. This end of the cord is connected as at 7 with a source of electric current supply, while the other end of the cord passes around a pulley 8 and upwardly around the small portion of the reel 3 and finally through a notch 9 formed in the larger portion of the reel where it is wrapped about the reel section 4. The cord is secured or anchored in the notch by a clamp 9a to prevent slippage on either reel. The free end of the cord passes through an opening 10 in the housing and is connected with a plug 11 of standard construction. This plug is adapted to be inserted in an electric appliance and when so inserted delivers electric current thereto, the appliance usually employed being laundry machinery, refrigerators, electric heaters, cookers, toasters, percolators, and so on. Such appliances are only intermittently used and the problem involved is that of facilitating the ease with which a connection can be made, of reducing wear and tear on the extension cord, and of finding a place to store the same when not in use. All these features have been taken care of in the present structure, as the housing A may be formed in a wall, in a piece of furniture, in the base of a floor lamp, and so on.

Figure 2:
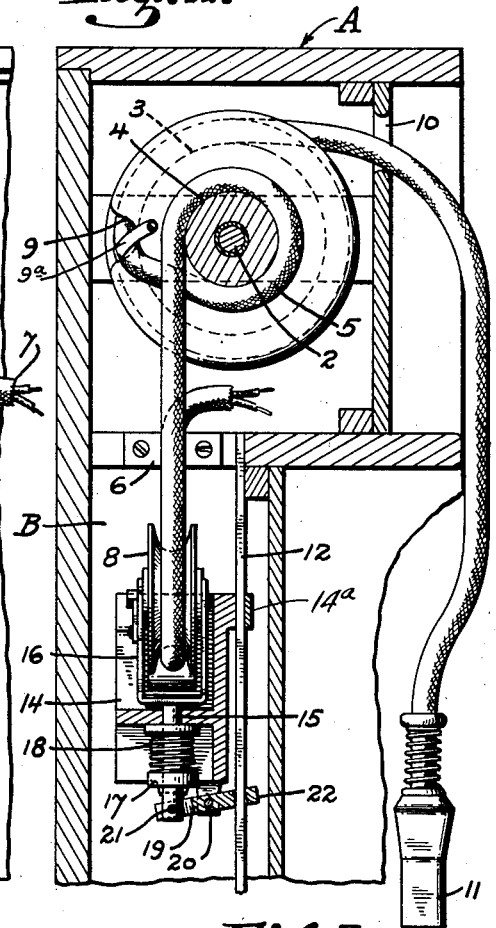
Fig. 2 is a side elevation in section of the mechanism shown in Fig. 1; showing lever 22 in the locking position.
Figure 2:
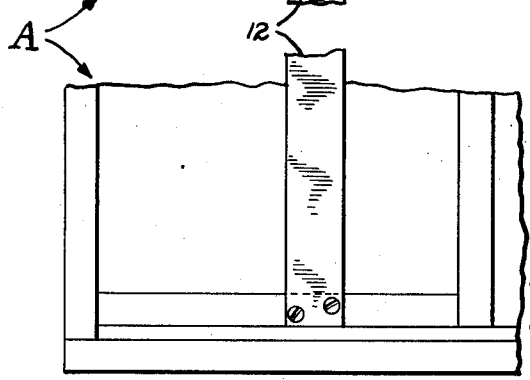

The extension cord disclosed in the present instance is readily extended for use as it is merely necessary to grasp the plug 11 and to pull the cord outwardly. In doing so the cord is unreeled from the reel 4. This will obviously have the capacity desired so that a cord can be extended six, eight, ten or more feet as required. After the cord is extended, it is locked in extended position and the plug is then inserted in the appliance to be used and when the person using the appliance is through, it is only necessary to pull the plug out and to re-reel the cord. Means are provided for automatically re-reeling the cord and this is accomplished as follows: Mounted within the housing is a bar 12 and slidably mounted and connected thereto by a lug 14a is a weight 14. Extending through the weight is a rod 15 and secured to the upper end thereof is a yoke 16 in which the pulley 8 is journaled. The lower end of the rod 15 is provided with a collar 17 and a spring 18 is interposed between the collar and that portion of the weight through which rod 15 extends. The lower end of the rod is straddled by the forked end 19 of an automatic locking member. This member is in the form of a lever. It is pivoted at 20 on a lug formed on the lower end of the weight 14 and it is also pivotally connected to the lower end of the rod 15 by means of a pin 21. If the bar is rectangular in cross-section the embracing portion of the locking lever will also be rectangularly shaped; hence, if the locking lever assumes a tilted position, such as shown at 22, in Fig. 2, the upper and lower edges of the locking lever will bite or grip the opposite surfaces of the bar 12 and will thus lock the weight against movement on the rod. On the other hand, if the locking lever assumes the horizontal position shown in Fig. 3, bar 12 is released and the weight, together with the locking lever, can slide free either upwardly or downwardly on the bar.

The weight 14 serves one function, to wit, that of automatically re-reeling the extension cord. The locking lever serves two functions: first that of locking the weight 14 against movement on the rod 12 so that the cord will not be re-reeled when in extended position; and, second, that of locking the weight against sliding movement on the bar 12 if the cord is released while it is being re-reeled. This feature will be later described.

In order that the function of the weight and the locking lever will be more clearly understood, the weight will be referred to as the retracting mechanism as its function is that of retracting or re-reeling the cord after it has been extended, and, further, let it be understood that the locking lever will be referred to as a locking means to prevent re-reeling of the cord under certain conditions.

Figure 3:
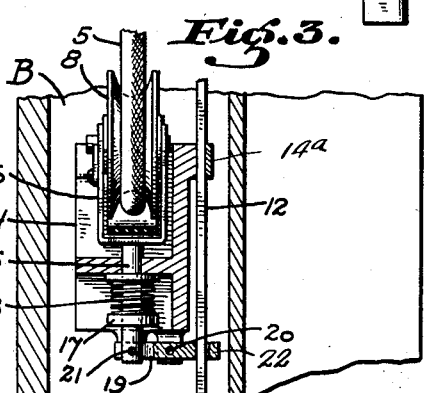
Fig. 3 is a sectional detail view of the retracting mechanism and the automatic lock actuated thereby, said view showing lever 22 in unlocked position.

In actual operation, if it is desired to extend the cord it is readily and easily accomplished by merely grasping the plug 11 and pulling it, together with the cord, in an outward direction until a desired length is obtained. The moment the plug is grasped and a pull is exerted on the cord, it will first lift the pulley 8 and the rod 15 in an upward direction, causing compression of the spring 18 and a rocking movement to be transmitted to the locking lever. In other words, the locking lever will be swung away from its angular biting or gripping position with relation to the guide bar 12, thus permitting free movement of the weight in an upward direction and as a consequence, free un-reeling of the cord. After the cord has been extended the proper or desired distance, it should be locked in its extended position so that there will be no tendency for the retracting mechanism or, in other words, the weight 14, to re-reel the same. This is obviously desirable for the simple reason that there might otherwise be a tendency to put sufficient pull or strain on the cord to pull a toaster, waffle iron, or a similar, fairly light weight appliance off a table or wherever it may have been placed. In order that the extension cord may be relieved of this strain or pull, the person extending the cord merely releases the pull or strain thereon and the moment this is done, spring 18 extends itself and throws the locking lever to the angular or locking position shown in Fig. 2, thus locking the weight or retracting mechanism, against operation and thereby relieving the extended portion of the cord of all pull or strain. When the appliance is to be disconnected, it is only necessary to pull out the plug 11 and to exert a slight pull on the cord. This causes re-compression of the spring 18 and movement of the locking lever from an angular position to a horizontal position such as shown in Fig. 3. The spring and locking lever serve as governor means to prevent the cord from being too rapidly retracted.

If the person desires to re-reel the extension cord, he merely permits the cord to move inwardly at a fairly slow rate, spring 18 will be maintained in compressed position, and the weight will move freely downwardly on the guide bar 12 and as such will rotate the reels 3 and 4 and cause the extension cord to be re-reeled or wound upon the larger portion of the reel indicated at 4, this being due to the fact that as the weight slides downwardly on the bar 12, the cord wrapped about the smaller portion of the reel 3 is unwound, thereby transmitting a rotary motion to the reels which causes the extension cord to be wound about the larger reel.

If during the retraction or re-reeling of the cord a person doing so should happen to let go of the plug or cord and thereby permit it to be retracted without any restraint, the weight would drop with greater speed and the speed would gradually accelerate causing the reel to rotate at such a rate that when the plug 11 finally reached the opening 19 there would be such a jerk that it might pull the wire ends of the extension cord out of the plug. This obviously would not be desirable and it cannot happen with the mechanism here shown for the simple reason that the moment the extended portion of the cord is unrestrained, spring 18 would immediately become extended and would thereby throw the locking lever to the angular position shown at 22 in Fig. 2, causing the locking lever to grip or bite the guide bar 16 and thereby lock the weight or retracting mechanism against further movement. Hence it is necessary to slightly restrain the inward movement of the extension cord when re-reeling the same for the simple reason that if the extension cord is released and permitted to reel up freely without restraint, the locking mechanism immediately locks and thereby prevents further reeling up or retraction of the cord and danger of damaging the plug 11 or of pulling the wire connections out or partially out thereof is accordingly eliminated.

An extension cord housed and contained as here shown is subject to less wear and tear than extension cords in general use. A person using such an extension cord will never have to waste time in hunting around to find one as it is always in its proper place and ready for use. It is always connected with a source of current supply, danger of pulling the wire ends of the cord free of the electric connections or terminals is avoided, short circuiting is thereby eliminated and all operations in connection with connecting or disconnecting a cord of this character are accomplished with the greatest of ease. The locking feature further avoids injury to the user or housing due to its positive and automatic lock action on accidental release of cord when in extended position. Lock action further provides an extended cord free of strain throughout its entire length.

While the structure has been particularly described in connection with electric extension cords connecting electric appliances whether domestic, commercial, or otherwise, it is obvious that it may have other uses; for instance, it may function as a clothesline reel or the like, as the extension cord might just as well be a clothesline as an electric conductor. It could be used to house a telephone extension cord and for retracting the same. Other uses of a similar nature will obviously suggest themselves, and while certain features of the present invention are more or less specifically described, I wish it understood that various changes may be resorted to within the scope of the appended claims. Similarly, the materials and finish of the several parts employed may be such as the manufacturer may decide, or varying conditions or uses may demand.

Having thus described my invention, what I claim and desire to secure by Letters Patent is—

1. A combination storage and retracting apparatus for extension cords comprising an extension cord, storage means for said cord from which the cord may be readily withdrawn, and means normally tending to retract the cord after it has been extended, and a governing device cooperating therewith whereby retraction is effective only when yielding resistance is offered to the return of the cord.

2. A combination storage and retracting apparatus for extension cords comprising an extension cord, storage means for said cord from which the cord may be readily withdrawn, means normally tending to retract the cord, and means effective upon release of the cord to prevent retraction but ineffective to prevent retraction when the retracting movement of the cord is yieldingly resisted.

3. A combination storage and retracting apparatus for extension cords comprising an extension cord, storage means for said cord from which the cord may be readily withdrawn, means normally tending to retract the cord, locking means for locking the retracting means, said locking means acting on said retracting means when the cord is released, and means preventing the operation of the locking means when a yielding resistance is applied to the retracting movement of the cord.

4. A combination storage and retracting apparatus for extension cords comprising an extension cord, storage means for said cord from which the cord may be readily withdrawn, a weight for retracting the cord, and means rendering the weight ineffective except when yielding resistance is offered to the retraction of the cord.

5. A combination storage and retracting apparatus for extension cords comprising an extension cord, storage means for said cord from which the cord may be readily withdrawn, a weight for retracting the cord but effective only when yielding resistance is offered to the retraction of the cord, and locking means cooperating with the weight and effective to lock the weight against movement only when the extension cord is relieved of yielding resistance.

6. A combination storage and retracting apparatus for extension cords comprising an extension cord, storage means for said cord from which the cord may be readily withdrawn, a weight for retracting the cord but effective only when yielding resistance is offered to the retraction of the cord, and locking means cooperating with the weight and effective to lock the weight against movement, said locking means being inoperative when yielding resistance is applied to the extension cord during retraction of the cord but automatically locking the weight against movement when the extension cord is relieved of yielding resistance.

7. A combination storage and retracting apparatus for flexible members comprising an elongated flexible member, storage means for said flexible member from which the flexible member may be readily withdrawn, means for automatically retracting the flexible member, and locking means cooperating with the retracting means and effective to render said retracting means inoperative when the flexible member is relieved of yielding resistance during retracting movement.

8. In a device of the character described, a storage member for a cord, said storage member permitting ready removal of the cord, a retracting mechanism connected with the storage member, said retracting mechanism automatically retracting the cord if retracting movement is yieldingly resisted, and means for automatically rendering the retracting mechanism inoperative if the cord is relieved of yielding resistance during retracting movement.

9. A retracting apparatus for extension cords comprising a reel having an extension cord wound thereon and from which the cord can be unreeled by exerting a pull on the cord, a re-reeling mechanism cooperating with the reel for re-reeling the cord after it has been unreeled, and a locking mechanism engaging the re-reeling mechanism for rendering it operative or inoperative, and means effective only upon movement of the extension cord for actuating the locking mechanism, said locking mechanism, locking the re-reeling mechanism to prevent re-reeling when the cord is extended and released and releasing the re-reeling mechanism to re-reel the cord when a yielding resistance is applied to the cord.

HENRY BOSCH, Jr.